Nov. 19, 1929.  E. C. OAKES  1,736,010
MILKING MACHINE PULSATOR
Filed Jan. 15, 1921  3 Sheets-Sheet 2
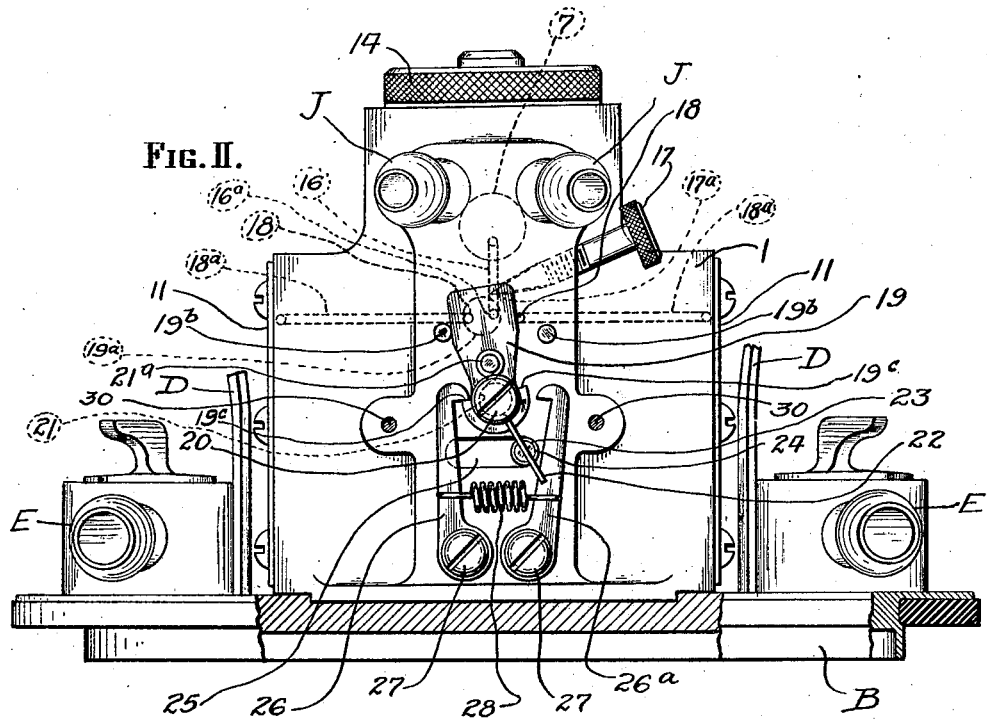
FIG. II.
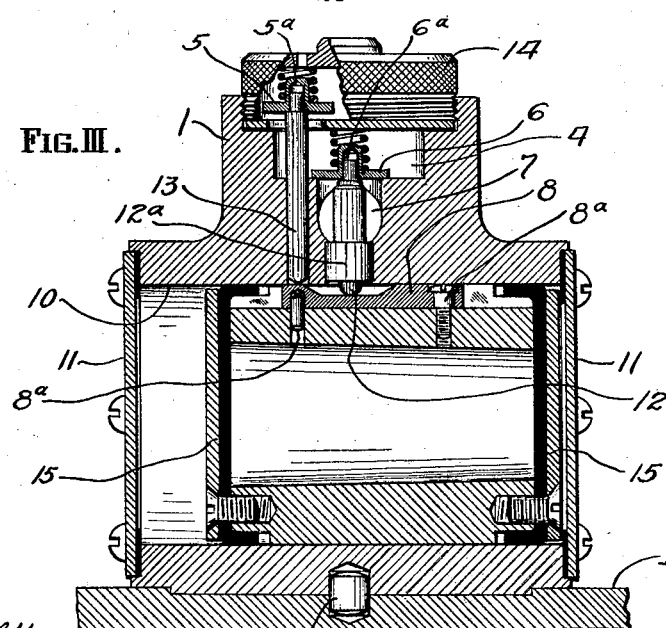
FIG. III.
Witnesses
Inventor
ERNEST C. OAKES
By his Attorney Nov. 19, 1929.   E. C. OAKES   1,736,010
MILKING MACHINE PULSATOR
Filed Jan. 15, 1921    3 Sheets-Sheet 3
Fig. IV.
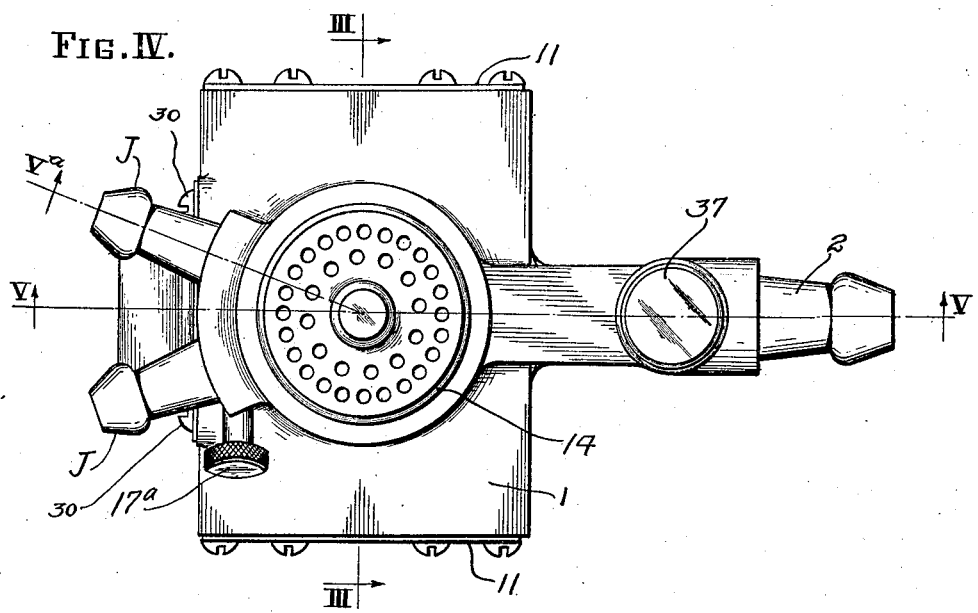
Fig. V.
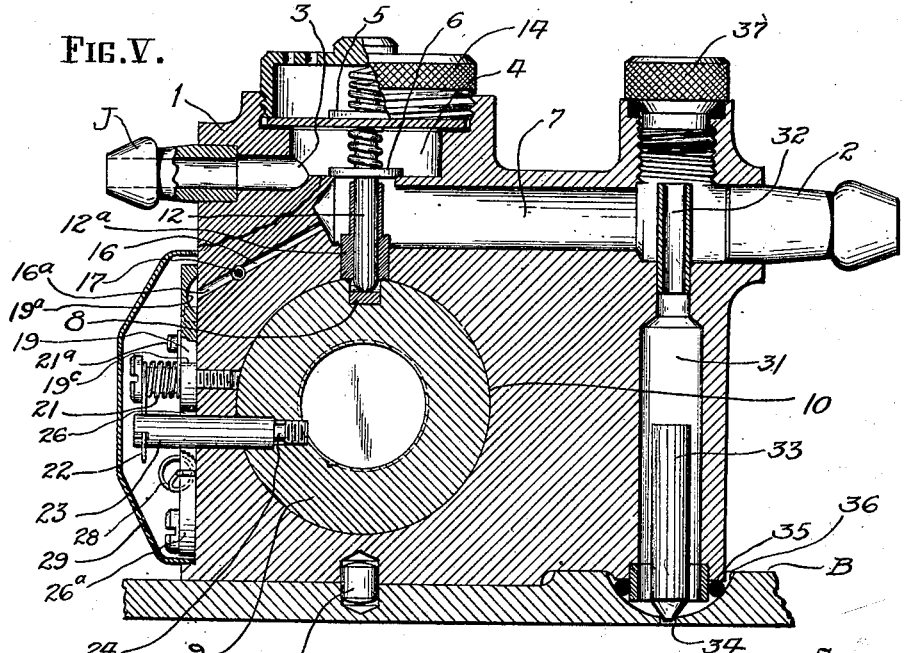
Witnesses
Inventor
ERNEST C. OAKES
By his Attorney Patented Nov. 19, 1929

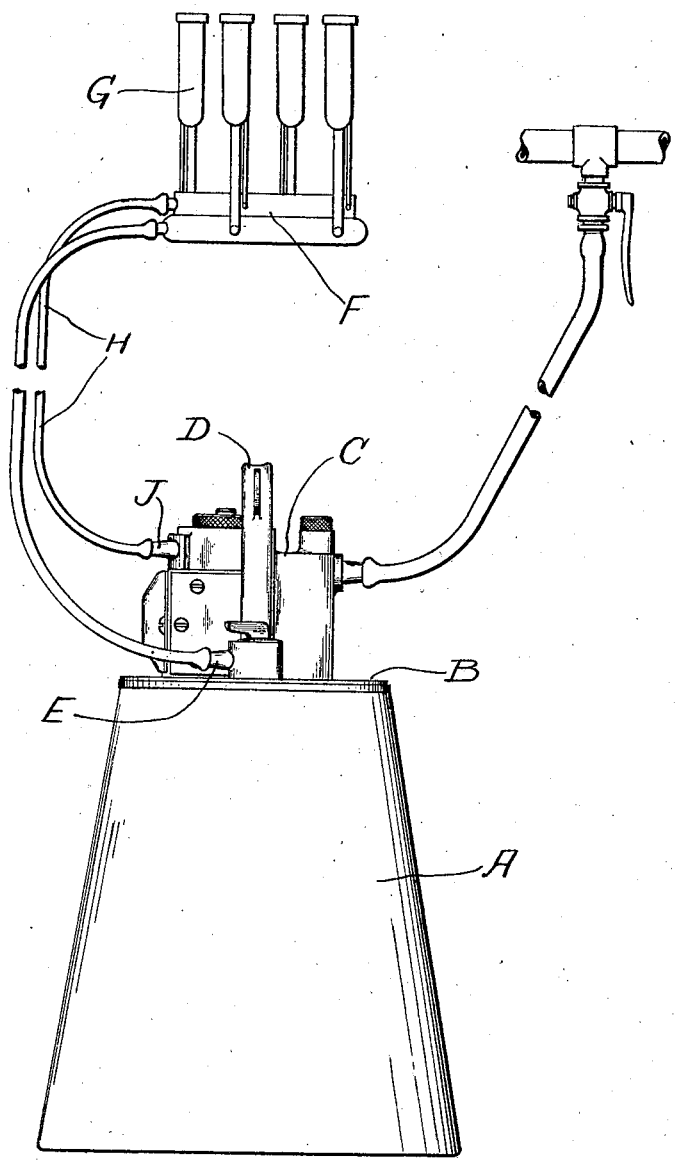

1,736,010

UNITED STATES PATENT OFFICE

ERNEST C. OAKES, OF DUNKIRK, NEW YORK, ASSIGNOR, BY MESNE ASSIGNMENTS, TO EMPIRE MILKING MACHINE COMPANY, INC., OF ROCHESTER, NEW YORK, A CORPORATION OF NEW YORK

MILKING-MACHINE PULSATOR

Application filed January 15, 1921. Serial No. 437,542.

This invention relates to the pulsating and control mechanism for milkers and more particularly the simplified and consolidated unit embodying the pulsator mechanism, ports and all connections forming as a unit a compact, simple and reliable structure meeting the exacting requirements in operation and having manifold advantages with respect to its manufacture and durability.

One particular embodiment of my invention is shown in the accompanying drawings, in which:

Fig. I is a side elevation of a milk pail with the unit pulsator mechanism showing connections for operation.

Fig. II is an end view of the pulsator mechanism on the pail cover.

Fig. III is a vertical section on line 3—3, Fig. IV.

Fig. IV is a plan view of the unit mechanism.

Fig. V is a longitudinal section on line V—V, Fig. IV, with a diverted section V$^a$ at one corner.

The pail A has a cover B with a mechanism unit C and handle D secured to the cover, while milkway bosses E are secured to the cover B leading to the claw F which forms the manifold for the teat cups G, from each of which the vacuum tube leads to claw F and from there connects by vacuum tube H to the nipple J.

The mechanism to control the milking machine and effect pulsations in the teat cups, comprises a unit in which the block 1 has the nipple 2 secured to it and adapted to provide connection from the stall pipe leading to the main vacuum line. Two nipples J—J are rigidly secured to block 1 and provide for the teat cup vacuum connection, and lead through holes 3 in these nipples to the chamber 4, with a valve 5 to control admission of outside air and a valve 6 to control the vacuum connection from the chamber to the port 7, which port leads to the nipple 2. These valves 5 and 6 are actuated by a cam 8 secured in a keyway or slot in the piston 9 reciprocating in the cylinder 10 formed as a transverse bore in the block 1 with end plates 11. This cam 8 engages the valve stem 12 at the bottom of valve 6 and the valve stem 13 at the bottom of valve 5, each valve having the cam action on its stem opposed by springs 5$^a$ and 6$^a$, respectively, which tend to force each valve on to its seat with predetermined pressure and constant action when the cam releases the end of the valve stem. The cam 8 is preferably let into the slot on an element of the piston and secured by dowel and screw, as shown at 8$^a$—8$^a$. Above the valve 5 a screw cap 14 is readily removable, but has a perforated top to admit air and may be screened, if so desired, to prevent the ingress of dirt.

The piston 9 has suitable end packing 15—15 to make it airtight and is laterally operated by making the main line vacuum effective at one end and allowing the atmospheric air pressure to the other end. This is effected by means of the port 16 which connects with the main vacuum port 7 and may be closed or throttled by means of needle valve 17 with its adjusting head 17$^a$. The orifice of this port is 16$^a$ where the hole in the surface is adjacent to holes 18—18 which lead to ports 18$^a$—18$^a$ connecting with opposite heads of the cylinder 10. These cylinder ports are alternately connected with the vacuum port orifice 16$^a$ by means of the oscillating slide valve 19, which has a cavity 19$^a$ arranged to straddle the orifice 16$^a$ and one of the openings 18 at the same time, and the edge of which slide valve 19 clears the other hole 18 so as to admit air when the other port is coupled up with the vacuum port 16.

This slide valve 19 is pivoted at 20 with a screw, around which spring 21 is wound and which forces the slide valve 19 against its seat with one end of the spring preferably held by stud 21$^a$ on the valve plate, while the other end of the spring 22 projects on the opposite side of the stud 20 engaging a notch in a sleeve 23 on a pin 24 which is screwed into the side of the piston 9 and projects through a slot 25 in the body of the block. This slot 25 permits reciprocating of the sleeve 23 with its pin and by connection with the spring end 22 tends to oscillate the slide valve 19 around its pivot 20, but the oscillation is checked and controlled by either one of the teeth 19ᶜ which are respectively engaged by the detents 26—26ᵃ carried by arms pivoted at 27—27, while spring 28 tends to pull the arms of the detents together causing the detents to engage the tooth 19ᶜ on one side or the other side of the slide valve plate 19. Thus the lateral motion of the pin with sleeve 23 first puts the tension on the spring end 22, tending to reciprocate the slide valve, but the detent 26 or 26ᵃ respectively hold the slide valve against oscillation by engagement with either one of the teeth 19ᶜ, until the piston has moved the sleeve 23 to the end of its stroke where it engages the arm of the detent 26 or 26ᵃ, throwing its end out of engagement with the tooth 19ᶜ whereupon the full tension of the spring 21 throws the slide valve 19 to its opposite position limited only by the stop pins 19ᵇ—19ᵇ.

All of this mechanism with its detents and reciprocating operating bar are enclosed with a suitable cap 29 by screws 30—30 forming a dust and oil-proof housing and a protection for the mechanism parts.

At the other end of the unit 1, a vertical port 31 has a tube near its top 32 projecting above the bottom of port 7, but through which the vacuum suction is effective in order to draw air from the milk pail through the port 34 controlled by the valve 33, while a gasket 35 forms an airtight connection with a shoulder 36 on the pail cover B. The top of the pipe 32 is accessible by unscrewing the cap 37, which closes the upper end of the bore which is formed for purposes of insertion or assembly, and for inspection and cleaning of the device.

The valve stem 12 is also preferably surrounded by a sleeve 12ᵃ so that any sediment or condensation collecting in the port 7 cannot leak past the valve stem to the piston.

In a particular embodiment of my invention described in detail and shown in the accompanying drawings, a unit is provided which contains the pulsator mechanism with all its operating and controlling parts combined in a very compact form with the air ports and chambers so that the handling of a single element provides for all of the connections and operation in conjunction with a milk pail cover or suitable base, without the necessity of bolting, screwing or locking together any couplings or joints. The only projections from an otherwise substantially solid block, are the nipples, namely, one for the main vacuum line stall tube, and two nipples, in the form shown, each to connect with one claw or teat cup manifold, thereby providing the means for milking two cows. Having all the ports within this block or single casing and particularly with the passages drilled or bored, the chance of joint leakage is entirely eliminated, and, furthermore, by the arrangement of the pulsator control mechanism any lubricated parts are so arranged, that in ordinary operation the tendency will be to withdraw any lubricant vapor or any oil away from the mechanism and away from the pail during conditions of operation.

Furthermore, the housing of all the mechanism is such as to prevent leakage on to the pail cover or other base; and any seepage or condensation in the stall tube vacuum line, or from other source, is accommodated in a manner which would prevent the return-flow to the pail valve of any sediment or impurities, so as to be a complete safeguard against bacteria contamination.

In particular it will be noted that combining all the mechanism, that is all moving parts in one unit with the couplings or nipples ready for the hose attachments, is accomplished in a structure with sufficient weight so that when in position it forms a contact at the milk pail cover vacuum valve hole by means of the gasket, so that on the application of the suction when opening the stall valve of the vacuum line, a tight joint is assured at the only point outside of all of the self-contained ports and valves, without any disturbance or chance of leakage due to failure to properly connect, or for any other reason that any other milking machines might be dependent upon the dexterity of the dairy hand. At the same time the rate of pulsations may be readily adjusted or will remain set, and the assured proper functioning will be obtained after proper supervision by the dairy man. In every respect the mechanism lends itself to uniformity and reliability of operation besides compactness and simplicity of construction, and in particular economy of manufacture.

While modifications may be made in various details and as to material, dimensions and arrangement, without departing from the spirit of my invention, what I claim and desire to secure by Letters Patent is:

1. In a milking machine, vacuum operated teat cups and a main vacuum line, an intermediate milk pail and a separable unit adapted to rest on said pail cover and be held thereto by suction, said unit containing all ports and pulsator control mechanism including a teat cup vacuum control valve and air valve with stems projecting to contact with a common cam, a reciprocating vacuum piston, a cam secured to reciprocate with said piston, and a detent release valve controlling the movement of said piston.

2. In a pulsator mechanism for a milking machine, a unit adapted to be held to a milk pail cover by suction and embodying all of the suction ports and pulsator control mechanism including a reciprocating piston, a cam on said piston, vacuum and air valves actuated by said cam, a slide valve to control the operation of said piston, a pair of detents to lock said slide valve in its alternate positions, spring actuating lever for said slide valve and means reciprocating with the piston to tension said spring and release each of said detents alternately, substantially as described.

3. A unit pulsator and port mechanism adapted to be held to a milk pail cover with a single pail cover vacuum valve connection, including a unit block with bored ports and cylinder bore, a reciprocating piston in said bore and a cam secured on one side of said piston, valve stems projecting through holes in said block engaging said cam and operated thereby to control the alternate vacuum and air inlets of a teat cup vacuum line chamber, a main vacuum port in said block and a piston port control hole leading to one face of the block, cylinder ports terminating adjacent said vacuum vent and a slide valve on one face of said block to control the vacuum connections to either end of said piston and simultaneously the alternate air inlet, means for adjusting the vacuum at both ends of said piston and detents and spring connection actuated by the movement of the piston to throw said slide valve at a fixed speed after predetermined movement of the piston.

4. In a milking machine, a unit mechanism adapted to be held to a milk pail cover embodying a block containing main line port, a branch port to the milk pail cover valve, a vacuum chamber connecting to a plurality of nipples for teat-cup connection, a reciprocating piston, pulsating valves contained in said block and directly operated by a cam secured to said piston, a quick-throw valve to alternate the reciprocations of the piston located on one face of the block and a housing detachably secured to said block and forming a sealed closure for said valve mechanism.

5. A unit pulsator and port mechanism for attachment to a milk pail for the operation of a vacuum milking machine, comprising a self-contained cylinder bore, a piston, a valve throw pin secure to one side of said piston, a slot in said unit to accommodate reciprocations of said pin projecting through the face of the block, a slide valve adjacent to the projecting end of said reciprocating pin and registering with a vacuum port and alternately one of two cylinder ports opening on the face of said block and a housing detachably secured to the face of said block and enclosing said valve slide and piston pin.

6. A unit mechanism for a vacuum milking machine system, comprising a self-contained unit of pulsator and vacuum ducts, adapted to be uniformly positioned on a milk pail cover with respect to a vacuum port through said cover, said unit mechanism having self-contained and supported means therein including teat cup port connections for pulsations, a main line suction port for said teat cup connections, a port positioned on said unit for ready connection with the port on the milk pail cover, and including within said unit mechanism a trap cooperating with the port connection for the milk pail cover removable and transportable with the unit separated from the milk pail cover, whereby foreign matter accumulated in the vacuum port and chambers of the unit mechanism is carried by said separate unit and prevented from entering the port leading to the milk pail.

In testimony whereof, I have signed my name to this application this 28th day of December, 1920.

ERNEST C. OAKES.